United States Patent
Chang

[19]

[11] Patent Number: 5,875,285
[45] Date of Patent: Feb. 23, 1999

[54] OBJECT-ORIENTED DATA MINING AND DECISION MAKING SYSTEM

[76] Inventor: Hou-Mei Henry Chang, 5113 Carolwood La., Durham, N.C. 27713

[21] Appl. No.: 755,387

[22] Filed: Nov. 22, 1996

[51] Int. Cl.$^6$ .................................................. G06F 15/18
[52] U.S. Cl. ............................... 395/62; 706/53; 706/12; 706/45
[58] Field of Search ................................ 395/50–54, 62, 395/60; 707/2

[56] References Cited

U.S. PATENT DOCUMENTS

| | | | |
|---|---|---|---|
| 5,263,126 | 11/1993 | Chang | 395/51 |
| 5,307,445 | 4/1994 | Dalal et al. | 395/66 |
| 5,353,371 | 10/1994 | Honiden et al. | 395/1 |
| 5,473,732 | 12/1995 | Chang | 395/77 |
| 5,499,371 | 3/1996 | Henninger et al. | 395/700 |
| 5,586,218 | 12/1996 | Allen | 395/10 |
| 5,666,525 | 9/1997 | Ross | 707/2 |

OTHER PUBLICATIONS

King et al, "Towards automated knowledge acquisition for process plant diagnosis," IEE Colloquium on 'knowledge discoverey in databases,' p. 3/1–4 Feb.1995.

Fayyad, U., et al., AI Magazine, (17)3, 1996, 37–54, From Data Mining to Knowledge Discovery in Databases.

Piatetsky–Shapiro, G., et al., AI Magazine, (15)3, 1994, 77–82, KDD–93, Progress and Challenges in Knowledge Discovery in Databases.

*Primary Examiner*—Tariq R. Hafiz

[57] ABSTRACT

The Object-Oriented Data Mining and Decision Making System is invented and disclosed. This system is an integration of two subsystems, the object-oriented data mining subsystem which is an object-oriented machine learning system, and the object-oriented decision making subsystem which is also called the object-oriented expert system. In this invention, object-oriented technology, a new technology in software design and development is applied. The difference between the methodology used in this invention and that used in all other learning systems and expert systems is that in this invention, all objects have the same attributes and actions and are in the same class in the whole process. At the same time, only objects themselves, nothing else are processed, without adding any additional structures, such as trees, hierarchies, and relations to them. Therefore a single class can cover all working objects in the whole process. Besides, statistical methodology is introduced to each object in the class.

20 Claims, 3 Drawing Sheets

OBJECT-ORIENTED DATA MINING AND DECISION MAKING SYSTEM

BACKGROUND OF THE INVENTION

This invention relates to the field of artificial intelligence, and more specifically to the fields of machine learning and expert system, and to object-oriented technology, therefore it is in the area of object-oriented machine learning and object-oriented expert system.

The goal of this invention is using machine learning and object-oriented technology to discover knowledge from databases and other data sources, and store discovered knowledge into a knowledge base. An object-oriented expert system can read the knowledge base and generate inference results directly.

The special features of the present invention are:

First, in the object-oriented technology, objects in a class are used directly, without introducing additional structures, such as tree structures of objects, decision trees, relations, or frames. From beginning to the end of the process, from the working objects to the result, the only structure discussed is object and class, and all objects are in the same class.

Second, in the learning process, generate-and-test technique is used in a top-down process, this means from the most general conjunctive objects to the less general conjunctive objects. And some threshold conditions are applied to the selection of the qualified learning objects.

Third, in the expert system, the inference process is reduced to the direct comparison between the test object and each knowledge object. If a matched knowledge object is found, the action in this object is executed. The same as in the object-oriented learning process, no additional structures, such as tree structures of objects, decision trees, relations, or frames are introduced.

The above three points disclosed in this invention are different from any existing systems or published technologies.

The inventor has a patent "Relational Artificial Intelligence System" (U.S. Pat. No. 5,473,732), in which the relational technology is introduced. The object-oriented technology is totally different from the relational technology. In the U.S. Pat. No. 5,473,732 there are relations and arrays but no objects and classes; in this invention, there are objects and classes, but no relations and arrays.

The inventor has another patent (U.S. Pat. No. 5,263,126). This is a table-formed expert system. Only tables but no objects and classes are discussed there. It is not object-oriented, therefore it is totally different from this invention.

SUMMARY OF THE INVENTION

An invention, the Object-Oriented Data Mining and Decision Making System (OODTDCM) is disclosed in this patent description. This system is an integration of two subsystems, the Object-Oriented Data Mining System (OODTM) which is an object-oriented machine learning system(OOLS), and the Object-Oriented Decision Making System (OODCM) which is also called the object-oriented knowledge-based system (OOKBS) or the object-oriented expert system(OOES). The whole system is object-oriented, this means the whole process is focusing on a set of objects. Objects in the OODTM are called the learning objects in the learning class; objects in the OODCM are called the knowledge objects in the knowledge class. The learning class and the knowledge class can be the same class, and all learning objects and all knowledge objects can be in the same class too. The result of the learning process can be entered into the OODCM directly, and the whole process of the OODTDCM is simplified to generating objects and comparing objects in the same class. Therefore the whole process has very high efficiency and can perform important tasks.

The data mining process is a machine learning process, and the engine used to perform the process is called the object-oriented learning engine (OOLE). OOLE uses generate-and-test methodology and generates conjunctive objects from more general conjunctive objects to less general conjunctive objects (Top-down). Moreover, a positive count, a negative count, and a certainty factor are introduced to each object, so that the engine can be applied to statistical environment. The learning result is stored in an object-oriented knowledge base (OOKB), which can be written in the table-format and/or the rule-format.

There is no "If-Then" rules in the OOKB, therefore a new type inference engine, the object-oriented inference engine (OOIE) is designed to infer the OOKB and generate the inference result. The inference technology used in the OOIE is called the object-oriented inference technology which is totally different from any existing inference technologies. The basic idea and methodology are to do the comparison between a test object and each object in the OOKB directly. The aim of the comparison is to find out one or more objects in the OOKB that match the test object, and finally fire the matched objects.

DESCRIPTION OF THE INVENTION

1. Learning class and learning object

The source data of the OODTDCM can be a database, a set of databases, a set of data of pixels, a set of data feeding from sensors, etc. To do data mining, the first thing is to select the relevant and interested data from the source data. The selection includes the attribute selection, the action selection, and the instance selection. The key point in the object-oriented data mining design is to select a set of learning objects and create a learning class (or classes) for them. The learning objects are selected from the instances of the source data, and the learning class is created based on the selection of attributes and actions. The definition of the "set" in this invention is the same as that defined in most algebra books and papers, namely "a set is a collection of elements".

In an object-oriented design, a class has attributes (or called variables), actions, and events. Attributes and actions of the learning class are selected from the attributes in the source data. And the attributes and the actions are mutually exclusive, that means the intersection of the attribute set and the action set in a learning class is an empty set, but both the attribute set and the action set cannot be empty. We need at least an attribute and an action in the learning class. Events can be added if any application requires, and the event set can be empty.

In an object, corresponding to each attribute there is a slot (or called a field) which can be taken to store a value. Each slot in the object corresponds to a field in its corresponding instance in the source data. Data in the source data can be in any data type, such as numerical value, character string, graphics, multimedia element, etc. In order to simplify and speed up the learning process, these data types are transferred to a simple data type called the code, which can be an integer, a character, or some other simple data types. Every field of different attributes in the learning class has the same simple data type, the code data type.

Three additional attributes, the positive count, the negative count, and the certainty factor, are added to the learning class. And hence three additional fields are added to each learning object. The meaning of these three additional attributes will be discussed in the next section.

One of the most important features of this invention is that all objects are in the same learning class from beginning to end of the learning process. This means the learning objects created from the data source, the intermediate working objects, and the final resultant objects are all learning objects in the same learning class. The resultant classification rules are some kinds of learning objects in the learning class too. Actually, they are more general learning objects satisfying given threshold conditions. Therefore the goal of the learning process is to generate some more general learning objects, which satisfy the given threshold conditions, from the learning objects created from the data source.

2. The object-oriented learning process
   A. The basic idea of the object-oriented learning process.
      a. Given threshold conditions.
      b. Conceptual clustering of all learning objects.
      c. Generating the most general conjunctive objects.
      d. Deleting unqualified conjunctive objects.
      e. Generating the less general conjunctive object from more general conjunctive objects.
      f. Re-count the positive count and the negative count of the generated object.
      g. Re-calculate the certainty factor of the generated object.
      h. Repeat processes d–g, until no more new conjunctive object can be generated.
   B. Definition of identical objects. Two learning objects, if all values in their corresponding attributes are equal, these two learning objects are called the identical objects.
   C. The determination of positive objects and negative objects.

We will discuss the "learning from examples" cases only. In "learning from examples" cases, positive instances and negative instances are needed, therefore positive objects and negative objects are needed. Different objects may have different action values. We can select any value or values in an action (or called the decision statement) as the positive value, and all others in the action as the negative values. If there is more than one action in the learning class, then select positive value from each action. If an object takes positive values in all of its action fields, this object is called the positive object; otherwise, it is called the negative object.
   D. Three additional attributes.

We can combine all identical objects into a new single object in the learning class, as all identical objects have the same values in all attributes. Because identical objects don't need to have the same action values, the combined new object can appear as a positive object, as a negative object, or even as both positive object and negative object if it is combined from some positive objects and some negative objects. It is necessary to remember that the combined new object is combined from how many positive objects and how many negative objects.

Three additional attributes, the positive count p, the negative count g, and the certainty factor C are added to the learning class (or to create a sub-class that has these three more attributes). The positive count p is used to count how many positive objects the combined object consists of; the negative count g is used to count how many negative objects the combined object consists of; and the certainty factor C is a function of p and g calculated for expressing how certain the combined object will appear as a positive object. Different formulas can be taken to calculate the certainty factor C. An example of a simple formula is:

$$C = p/(p+g) \quad (1.1)$$

In some stochastic books and papers, some authors use the term uncertainty factor or uncertainty index instead of the certainty factor. From formula (1.1) we know that the uncertainty factor will equal 1−C.
   E. Fuzzification of some attributes.

In medical data, age is an important factor. But in most cases in statistics, a single year is of no significance, and data are not sensitive to a single year. We can not find the obvious difference between the age of 37 or the age of 38. The same is the case with blood pressure. We can not find the obvious difference between the patient's blood pressure 142 and blood pressure 143. If we don't fuzzify these attributes, in most cases, no classification rules, or only poor classification rules can be generated.

To obtain some reasonable and useful classification rules, we have to fuzzify these attributes. We can divide the consecutive integer of age into a fuzzy set, such as teenager, young, middle-aged, older, very old, etc. Then, the difference between these age groups in some cases will be substantial, and good classification rules can be generated. Just like sizes of shirts in the clothes department, they are fuzzified to small, medium, large, and extra large, etc.
   F. Conceptual clustering with certainty factor.

In the conceptual clustering process, all identical objects are combined into a new single object. Therefore p and g are used to express the numbers of positive objects and negative objects the combined new object contains. In other words, the combined new object can represent p positive objects and g negative objects. And the certainty factor C for the combined new object is calculated from formula (1.1).

Two threshold conditions are introduced in this invention, one for the certainty factor and another one for the positive count. The threshold condition for the certainty factor can be expressed by the following expression:

$$C \geq T \quad (1.2)$$

where the threshold T is given by the user. At the same time, a minimum positive count $P_{min}$ can be assigned by the user. The threshold condition for the minimum positive count can be expressed as:

$$p \geq P_{min}. \quad (1.3)$$

If the positive count of a combined object is too small and doesn't satisfy condition (1.3), the result will be discarded, because:
   a. This classification rule might be generated from noisy data, or error data, etc.
   b. This classification rule is not general enough and represents only a small number of instances.

The resultant objects will be dropped, if they don't satisfy conditions (1.2) and (1.3). It is obvious that the threshold T is a floating point value and satisfies that $T \geq 0.0$ and $T \leq 1.0$; and $P_{min}$ is an integer and satisfies that $P_{min} \geq 1$. If the user assigns that C=0, and $P_{min}$=1, this means all resultant objects will be selected, and none of them will be dropped.

The introducing of the positive count, the negative count, the certainty factor, the threshold for the certainty factor, and the minimum positive count enables the data mining system to be used in statistical environment including noisy data, missing data, and error data.
   G. The bottom-up objected-oriented conjunctive generalization (Generate the more general conjunctive object from less general conjunctive objects).

Seed object and seed field. If a learning class has m attributes, then each object in the class has m fields, and each field corresponds to an attribute. A field is the intersection of an object and an attribute, and a value can be stored in each field of the object. Any positive object in a learning class can be taken as a seed object, and any field of the seed object can be taken as a seed field. The value in the seed field of the seed object is called the seed value or simply the seed. A seed field of a seed object is a starting point to do the bottom-up conjunctive generalization.

An object is called a potential conjunction object (PCO) of the seed object, if the value in each field of the object is equal to the corresponding one in the seed object except the seed field. If values in the seed fields of all PCOs of the seed object form a conjunction of the seed value, then a conjunction object of the seed object can be created. The conjunction object of the seed object is an object in the same class, and all fields of the conjunction object have the same values as those in the corresponding fields of the seed object except the seed field, in which a conjunction of the seed value is stored. A conjunction object is more general in concept than the seed object and all other PCOs of the seed object. Therefore the conjunction object can be served as a substitute for all such objects. This is one of the key points of the conceptual generalization.

Total conjunction object and partial conjunction object. A conjunction object is called the total conjunction object of the seed object, if all possible values in the seed field are included in different PCOs of the seed object. In other words, the conjunction is called the total conjunction and the conjunction object is called the total conjunction object of the seed object, if the conjunction includes all possible values of the attribute that corresponds to the seed field. A blank (or N/A) which means "don't care" can be written in the seed field of the conjunction object, if it is a total conjunction object. "Don't care" is the most general concept conjunction for a seed field of a seed object, because it matches any possible value in the corresponding field of another object.

A conjunction object is called the partial conjunction object of the seed, if the conjunction includes only a part of all possible values of the attribute. In the partial conjunction object, values in all fields are the same as those in the seed object except the value in the seed field. In the seed field, only a part of all possible values is included. This partial list of all possible values can be expressed by a single symbol which will be written in the seed field of the partial conjunction object.

H. The top-down objected-oriented conjunctive generalization (Generate the less general conjunctive object from more general conjunctive objects).

The most general conjunctive object. If a learning class has n attributes, a learning object in it can have at most n−1 total conjunctions. In this case, only a single field in the learning object is non-blank, and all others are blanks. An object having k total conjunctions (that means it has k blank fields) is called the conjunctive object of rank k. The object of higher k is defined as the object of higher conjunctive rank. The conjunctive object of rank n−1 is of the highest rank in the class having n attributes, and it is the most general conjunctive object in the class. It is obvious that a learning class of n attributes can have up to n sets of different most general conjunctive objects.

Positive count and negative count. Because the blank field means "don't care", and only a single field in the conjunctive object of the highest rank is non-blank, its positive count can be obtained from the database as follows. If the value in the non-blank field is expressed by $V_1$, and the field is in the attribute A1, the positive count of the conjunctive object is equal to the sum of all positive counts of objects whose value in attribute A1 is $V_1$ in the database; and the negative count of the conjunctive object is equal to the sum of all negative counts of objects whose value in attribute A1 is $V_1$ in the database.

The combination of conjunctive objects. If there are two conjunctive objects A and B, and the intersection of their non-blank fields is zero, this means these two objects have different non-blank fields, then the union of these two objects forms a new combined conjunctive object, if blank field(s) exists in the new object. If object A has values in its fields $A_1, A_2, \ldots$, and object B has values in its fields $B_1, B_2, \ldots$, then the union of objects A and B has values in fields $A_1, A_2, \ldots$, the same as object A, and values in fields $B_1, B_2, \ldots$, the same as object B, and the other fields are blanks. This is the technology used to combine two more general conjunctive objects into a single less general conjunctive object. And objects A and B are called the parent objects of the new combined conjunctive object.

The positive count, the negative count, and the certainty factor of the new combined object can be recounted and recalculated. Because the size of a subset of a set is always less than or equal to the size of the set itself, the positive count of the new combined object is less than or equal to that of its parent objects; but the certainty factor of the new combined object may be greater or smaller than that of its parent objects.

The creation of the most general conjunctive object. Any value $V_1$ of an attribute can be taken to create the most general conjunctive object, in which all fields are blank except the selected attribute having value $V_1$. Its positive count and negative count can be counted from the database directly, and its certainty factor can be calculated from the positive count and the negative count.

The selection of qualified conjunctive objects. Set a threshold $T_p$ for the positive count, if the positive count of a conjunctive object is less than $T_p$, the conjunctive object is unqualified and will be discarded, and the others are qualified conjunctive objects. As we discussed above, the positive count of an object combined from an unqualified object with any other object will always be less than $T_p$, because the size of a subset of a set is always less than or equal to the size of the set. Take higher $T_p$, we can make the size of the qualified conjunctive object set smaller.

Qualified combined conjunctive objects. By combining any two of the above selected qualified conjunctive objects, a new combined conjunctive object of lower rank (less general) is generated, and its positive count and negative count can be recounted from the database directly. Making all possible combinations of the above selected conjunctive objects and applying the selection technique mentioned above, a set of new qualified combined conjunctive objects is generated. We can combine the new qualified conjunctive objects with the existing conjunctive objects once more again, so a new set of conjunctive objects is generated again. This process can be repeated as many rounds as we like, until no new qualified combined conjunctive objects can be generated.

During the above process, if any conjunctive object satisfies the certainty factor condition and the minimum positive count condition (and/or some other conditions assigned by the user) it is a resultant object, i.e., it is a required classification rule, and will be displayed to the user and saved to a file. This conjunctive generalization technology is applying the generate-and-test methodology to the combination of conjunctive objects, and the generation of less general conjunctive objects from more general conjunctive objects. This technology is different from any existing learning technology.

I. The generated object-oriented knowledge base (OOKB).

The OOKB is a set of objects in the learning class generated from the OODTM. This learning class is taken as the knowledge class for the OODCM. Users can add some actions or events to the knowledge class if they wish. The OOKB has the same structure as the learning class, therefore the interface between these two subsystems is seamless.

3. The Object-Oriented Decision Making System (OODCM)

The OODCM is composed of an object-oriented knowledge base (OOKB) and an object-oriented inference engine (OOIE). The OOE infers the OOKB and generates the inference result. The OOKB can be generated by the OODTM or entered by the user by other means. The object in the OOKB is called the knowledge base object.

The OOIE is a built-in executable computer program. It creates a knowledge class (KC), which has the same attributes and actions as the OOKB. It reads and transfers the OOKB to a stored knowledge base (SKB) in which all values are expressed in code. All objects in the SKB belong to the KC and are called the knowledge object (KO). Each KO has a corresponding knowledge base object in the OOKB.

At the same time a test object (TO), or called query object (QO), in the same knowledge class is created. All fields of the TO are empty. If test data exist and are entered to the TO, the TO will be compared with each KO in the KC to find a match. The "match" of a TO and a KO is defined as follows:

a. Permissible values of an attribute. In a KC, there are many different values in different KOs corresponding to the same attribute. All of these values are called the permissible values of the attribute and form a permissible value set. In the corresponding field of the TO, only values which appear in the permissible value set are allowed to be entered. If the user doesn't know or doesn't care the value, an "Unknown" or a "don't care" can be entered.

b. Attribute match. If either one of the following conditions is fulfilled, the discussed attribute of the TO and that of the KO are a match.
  b1. In the same attribute, if the TO and the KO have the same or in the same value range, or
  b2. If the value of the KO or the TO in the attribute is "don't care" (can be written as N/A, or blank), it is an attribute match, no matter what value the other one takes in the attribute.

c. Object match. If all attributes (or with the exception of one or more attributes) of a TO match those of a KO, then these two objects match.

d. If a TO matches a KO, then all actions of the KO will be executed.

The whole comparison process of comparing the TO with each KO in the knowledge class is the whole inference process of the OODCM. In the inference process, if a KO, that matches the TO is found, the action of the matched KO will be executed. If no KO matches TO, and there exists one or more unknown field in the TO, a series of queries about the unknown fields can be executed and the user or other parts can be asked to give a response. After a response is obtained, an unknown field of the TO is filled by the response, a comparison process of comparing the TO with each KO will be executed again, until a matched KO is found or no matched KO can be found. If all possible comparisons are made and no matched KO can be found, an "inference fails" message will be displayed.

DETAILED DESCRIPTION OF DRAWINGS

Figure 1:
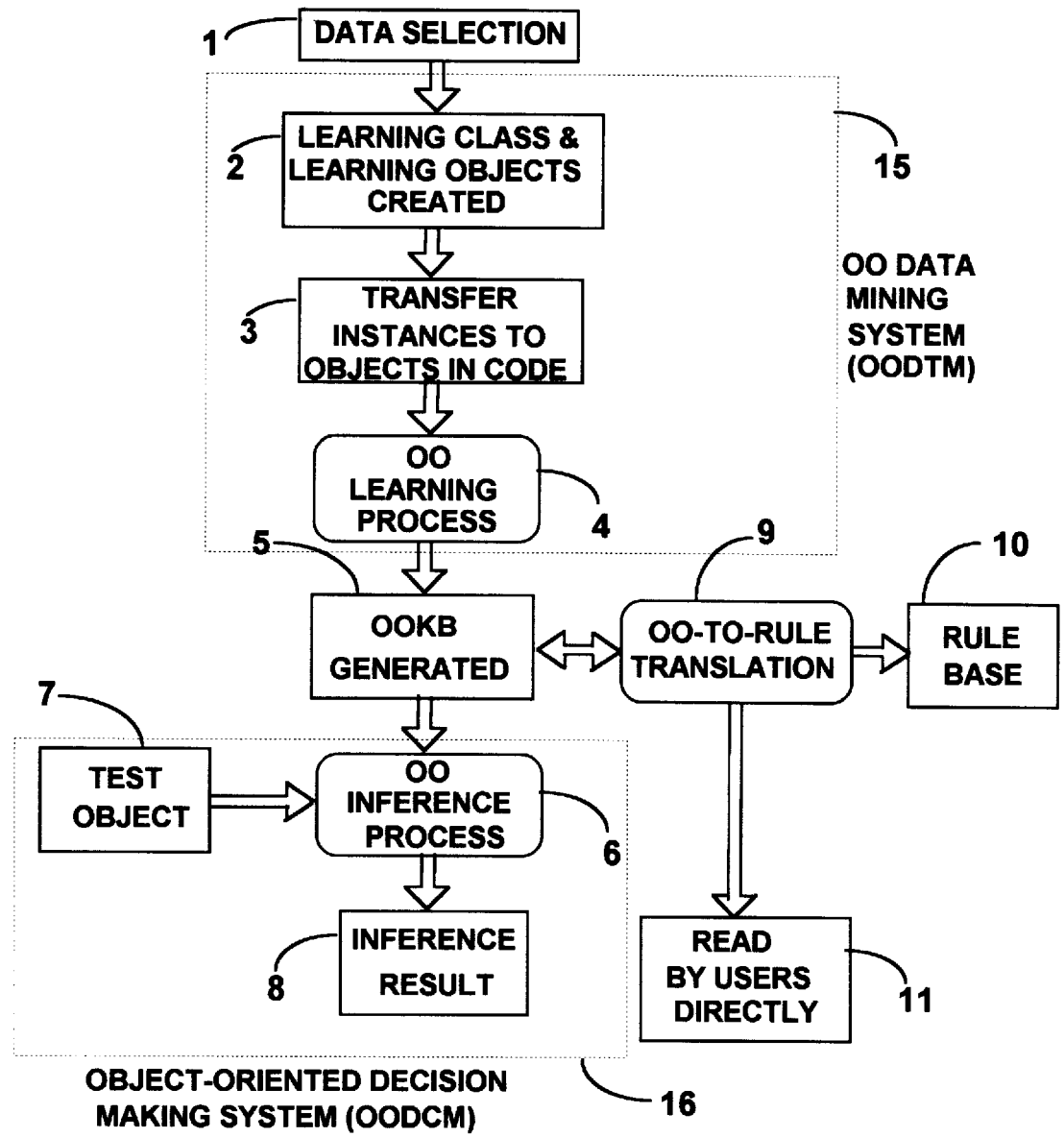
FIG. 1 is a schematic diagram showing the working principle of the Object-Oriented Data Mining and Decision Making System.

FIG. 1 shows the working principle of the object-oriented data mining and decision making system. Each block in the diagram corresponds to a process or a result. They can be explained as follows:

Block 1: The process of data selection. To do data mining, we have to have source data. The source data can be a database, a set of databases, a set of data in pixels, a set of data from sensors, and so on. The first step is to select the relevant and interested data in the source data, and enter only the selected data to the data mining system. The selection includes the attribute selection and the instance selection. A subset of attributes and a subset of actions (the attributes and the actions will be explained in Block 3 in more detail) are selected from the attributes of the source data. These two subsets are mutually exclusive, and cannot be empty. This means we have at least an attribute and an action to enable the learning system to work (Sometimes, in this invention, the action is called the decision or the decision attribute). We can select all attributes in the source data as the attributes and the actions, or select only a part of them. Because we have to have at least one selected attribute and one selected action, the source data must have at least two attributes. At the same time, a subset of instances is selected from the source data too. The selected instances can be equal to or less than those in the source data, but cannot be empty.

Block 2: The process of creating the learning class and the learning object. A learning class is created with the selected attributes as its attributes and the selected actions as its actions. Learning objects are created in the learning class from their corresponding instances. But there are some differences between instances and learning objects.

Each attribute and each action in the learning class correspond to an attribute in the source data, and they may or may not have the same name. Each learning object corresponds to an instance in the source data. There is a slot in each attribute or each action of a learning object, and a value can be stored in the slot (the slot is sometimes called the field or the cell). But in each slot of a learning object, a code of the value, not the value itself, is stored in its corresponding field of the instance in the source data. This will be explained in Block 3.

Besides the selected attributes and the selected actions, three additional attributes are added to the learning class, They are the positive count attribute, the negative count attribute, and the certainty factor attribute. And hence, three more additional fields are added to each learning object. More detailed explanations are in Blocks 22 and 24.

Block 3: Transferring instances into objects in code. In OODTDCM, there is a transfer engine which transfers each selected instance into a learning object in the learning class. The value in each field of the learning object is translated by the transfer engine into code. The introducing of the code of each value can save memory and speed up the learning process. The value in each field of an instance in the source data can be a number, a character string, a text file, an icon, a graphic figure, a multimedia component, and/or some others. The code is in a simple data type, an integer, a character, or some other simple data types. In the course of transfer, an attribute-value table is created as a dictionary or a code book of the translation. When the result is generated, the code can be translated back to its original value with the aid of the attribute-value table. Therefore the original value will be displayed to the user. Inside the system, everything is processed by the code. However, outside the system, everything is still expressed by its original value.

Figure 2:
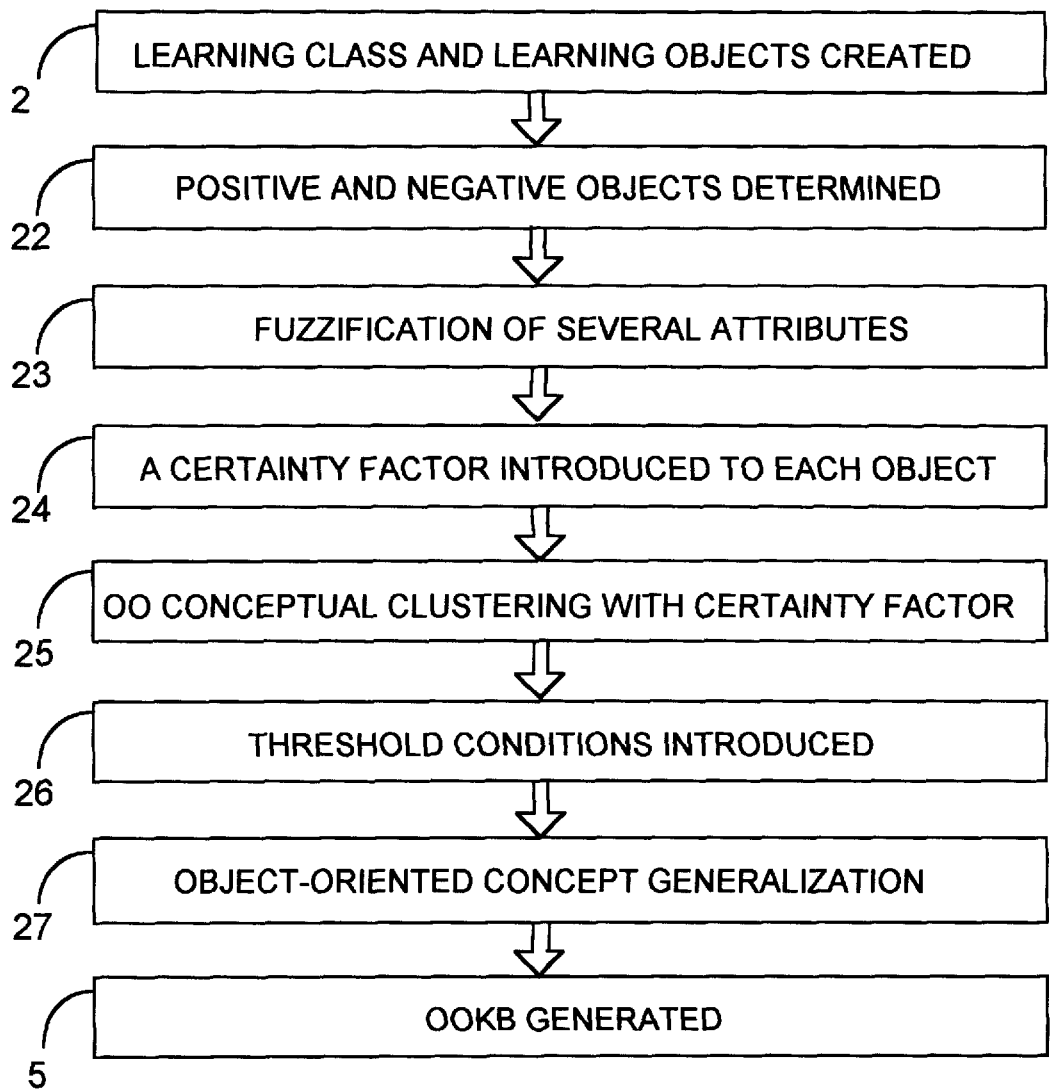
FIG. 2 is the schematic diagram illustrating the learning process of the object-oriented data mining subsystem in more detail. Because the system can work independently, it is sometimes called the object-oriented data mining system.

Block 4. Object-oriented learning process. The object-oriented learning process is the key part of this invention. A more detailed block diagram of this process is shown in FIG. 2.

Block 5: Object-oriented knowledge base generated. The result of the object-oriented learning process is an object-oriented knowledge base. It is object-oriented, therefore it is easy to be output in the table-format or in the rule-format. We output it in both table-format and rule-format. The table-format output is served as the input knowledge base (IKB) of the OODCM, which requires a table-formed IKB. The rule-format output can be served as the knowledge base of the regular expert system, or can be read directly by users.

Block 6: Object-oriented inference process. This process is the key process of OODCM, and will be explained in more detail in FIG. 3. OODCM reads the IKB and creates a knowledge class with a set of knowledge objects in the computer memory. The inference process will be started when the test object is entered.

Block 7: Test object. The test object is an object with the same attributes as the knowledge object. But it has neither the three additional attributes nor the action(s). The inference process of the object-oriented inference engine is to test if the test object matches any knowledge object in the knowledge class. If it does, the action of the matched knowledge object will be triggered.

Block 8: Inference result. The action(s) of the matched knowledge object in the knowledge class will be executed.

Block 9: The object-oriented expression to rule translation. Translation from object-oriented expression to table format is straightforward; but translation from object-oriented expression to rules is not straightforward, some translation mechanism is required.

Block 10: The rule base. The translated rule base satisfies the requirements of some expert systems and can be served as the rule base of them.

Block 11: Read by users directly. At the same time, the rule base can be read by users directly.

Block 15: Shows the whole object-oriented data mining system (subsystem).

Block 16: Shows the whole object-oriented decision making system (subsystem).

FIG. 2 is the block diagram of the Object-Oriented Data Mining System, i.e., the object-oriented learning system. It illustrates the learning process of the OODTM in more detail. Each block can be explained as follows:

Block 2: The learning class and the learning object created. This is the first step of the object-oriented learning process. This is the same block 2 as shown in FIG. 1 (see explanation there).

Block 22: Positive objects and negative objects determined. In the action (the action can be called the decision attribute) of the learning class, different objects can take different values. Some of the values can be taken as positive value(s), and all others as negative values. The learning objects that take the positive value in their action are called positive objects, and all others are called negative objects. If there is more than one action, we can take any value or values of each action as the positive value and all others as the negative values of the action. If an object takes positive values in all actions, it is a positive object; otherwise it is a negative object.

In the learning class, three additional attributes, the positive count, the negative count, and the certainty factor are added. And in each KO, three additional fields are added. They are the positive count field, the negative count field, and the certainty factor field. If it is a positive object, we will fill 1 in its positive count field, and 0 in its negative count field; if it is a negative object, we will fill 0 in its positive count field, and 1 in its negative count field.

Block 23: Fuzzification of several attributes.

If we want to obtain reasonable and useful classification rules, sometimes we have to fuzzify some attributes. Meanwhile, some additional benefits can be obtained if some attributes are fuzzified, such as non-linear classification can be achieved in some cases. One of the examples of fuzzification is to divide the consecutive integer of age into a fuzzy set, such as teenager, young, middle-aged, older, very old, etc. After the fuzzification, the difference between different age groups in some cases will be obvious, and good classification rules can be generated.

What attributes need to be fuzzified, and how to fuzzify them? This will be done based on pre-knowledge, on tests, and on experience of the user.

Block 24: A certainty factor introduced to each object. The certainty factor C for each object is a function of its positive count value p, and its negative count value g. One of the simple formulas can be taken to calculate the certainty factor is:

$$C = p/(p+g) \tag{1.1}$$

Block 25: Object-oriented conceptual clustering with certainty factor. If values in all attributes (action is not included) of two objects are equal, then these two objects are called identical objects. In the conceptual clustering process, all identical objects are combined into a single object. And p and g are used to count how many positive objects and how many negative objects are combined to form this combined object, respectively. Or we say that the new object is a combination of p positive objects and g negative objects. And C is calculated from formula (1.1).

Block 26: Threshold conditions introduced. Threshold conditions include two conditions, the threshold for the certainty factor T, and the minimum positive count $P_{min}$. Both of them can be assigned by the end-user.

The threshold condition for the certainty factor can be expressed as follows:

$$C \geq T \tag{1.2}$$

where C is the certainty factor for a learning object, and T is the threshold assigned by the user.

At the same time, a minimum positive count $P_{min}$ can be assigned by the user, and the threshold condition for the minimum positive count can be expressed as:

$$p \geq P_{min}. \tag{1.3}$$

The resultant objects will be selected and displayed, only if they satisfy conditions (1.2) and (1.3). It is obvious that T is a floating point number and satisfies that $T \geq 0.0$ and $T \leq 1.0$; and $P_{min}$ is an integer and $P_{min} \geq 1$. If the user assigns that C=0, and $P_{min}=1$, all resultant objects are selected.

The introducing of the positive count, the negative count, the certainty factor, the threshold for certainty factor, and the minimum positive count enables the data mining system to be used in statistical environment including noisy data, missing data, and error data.

Block 27: Object-oriented concept generalization. The goal of the data mining system is to find general classification rules to classify the positive objects from negative objects. The methodology is to find the general conjunctions of all learning objects satisfying the threshold conditions.

Block 5: Object-oriented knowledge base generated. All general conjunction objects generated in block 27 that satisfy threshold conditions (1.2) and (1.3) will be entered to the object-oriented knowledge base.

Figure 3:
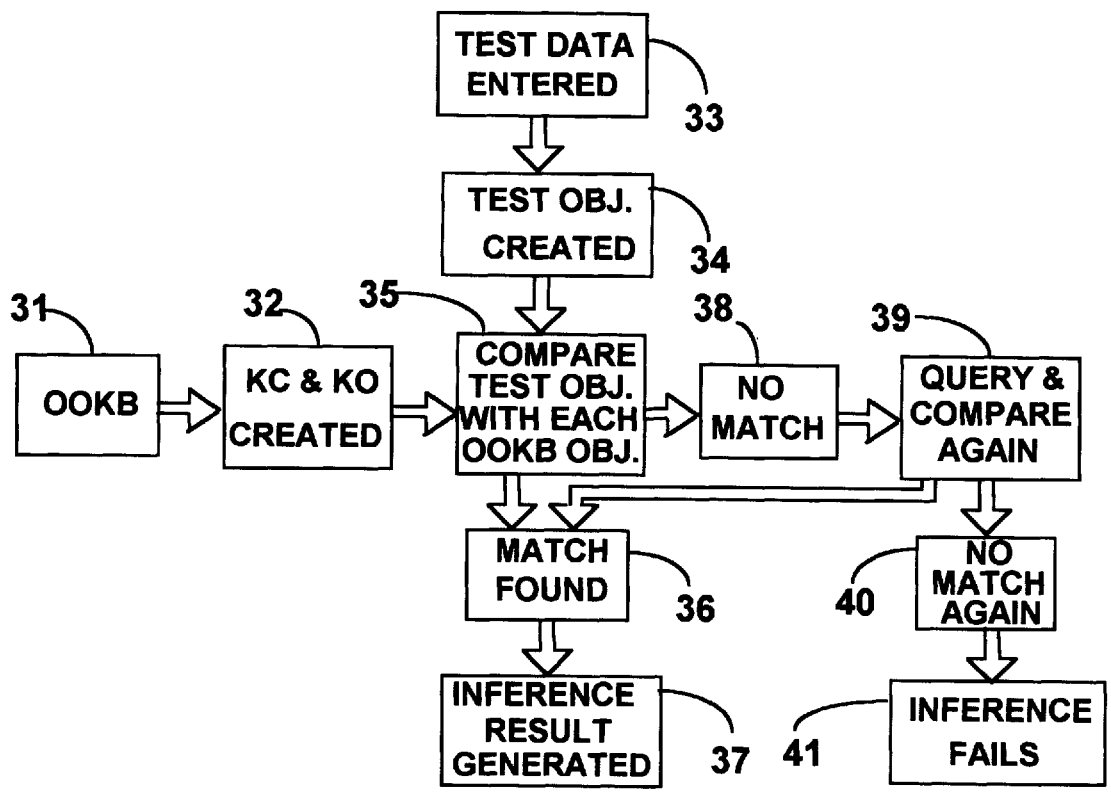
FIG. 3 is the schematic diagram illustrating the inference processes of the object-oriented decision making subsystem. Because the system can work independently, it is sometimes called the object-oriented decision making system.

FIG. 3 is the block diagram of the Object-Oriented Decision Making System, i.e., the object-oriented expert system (OOES). Each block can be explained as follows:

Block 31: Object-oriented knowledge base (OOKB). This is the input knowledge base (IKB) of the OODCM. It can be created by the OODTM, by any other systems, or by human experts manually. It contains a set of knowledge base objects and can be expressed in the table format, which is required by the OOES.

Block 32: Knowledge class (KC) and knowledge objects (KO) created. The object-oriented inference engine (OOIE) in the OOES will read the IKB and create the knowledge class composed of a set of knowledge objects. The knowledge class in OOES has the same structure as the learning class in OOLS. There is a transfer engine in the OOES, which transfers the IKB to SKB in the code expression. The element in IKB can be in any data type, such as, numerical values, character strings, graphics, multimedia elements, etc.; however, the element in the SKB is in the simple code form translated by the transfer engine. The code can be in the form of integers, characters, or any other simple data types.

There is a great difference between the IKB described in block 31 and the SKB described in block 32. IKB is created by something outside the OODCM, such as created by the user, by the OODTM, or by some other systems. The class of IKB is called the knowledge base class, and objects in the class are called knowledge base objects. However, SKB is created by OODCM itself based on the IKB. The class of SKB is called knowledge class and objects in the class are called knowledge objects. Both IKB and SKB are stored in the computer storage, but they are two different things. In most cases, IKB is in the disk, but SKB is in the memory. However, in some simple cases, SKB can be the same as IKB.

Block 33: Test data entered. The value in each attribute of the test object, described in Block 35, is filled by the end-user manually, or by some other software, hardware, or instruments.

Block 34: Test object (TO) created. The test object is an object in the knowledge class. It has the same attributes as all other knowledge objects, but has no action, or we say its value in the action attribute is NULL.

Block 35: Compare the test object with each object in the OOKB. This is the key step in the object-oriented inference process. Because there is no rules in the object-oriented knowledge base, the inference process of this invention is totally different from other expert systems. The inference process is as follows:
1. Fill entered data (if any) into the corresponding fields of the TO.
2. If the TO is not empty, compare it with each KO in the KC and try to find a match.

Block 36: Match Found. If one or more KOs match the TO.

Block 37: Inference result generated. The action(s) of the matched KO will be executed.

Block 38: No match. If no match can be found and one or more fields of the TO are empty (unknown), the system will start a querying process and go to Block 39.

Block 39: Query and compare again. The system will start a querying process, and will fill the blank field of the TO, if a response is obtained. In the querying process, the system will send a message and ask a response from the user, databases, softwares, or any instruments depending on the design. Once a response is obtained, the system will do the comparison again. If more query is necessary, the system will do it again, until a match is found or inference fails. If a match is finally found, the system will go to blocks 36 and 37 to execute the action statement of the matched KO.

Block 40: No match again. No match can be found after all possible queries.

Block 41: Inference fails. If no match can be found after all possible queries, an "inference fails" message will be sent to the user (such as display an "inference fails" message on the screen), and the inference process will stop.

Acronym

IKB: Input Knowledge Base
KC: Knowledge Class
KO: Knowledge Object
OOCG: Object-Oriented Conjunctive Generalization
OODCM: Object-Oriented Decision Making System
OODTDCM: Object-Oriented Data Mining and Decision Making System
OODTM: Object-Oriented Data Mining System
OOES: Object-Oriented Expert System
OOIE: Object-Oriented Inference Engine
OOKB: Object-Oriented Knowledge Base
OOKBS: Object-Oriented Knowledge-Based System
OOLE: Object-Oriented Learning Engine
OOLS: Object-Oriented Learning System
PCO: Potential Conjunction Object
SKB: Stored Knowledge Base
TO: Test Object

I claim:

1. An object-oriented data mining and decision making system in a digital computer performing data mining and decision making through the aid of a set of CPUs of said digital computer, comprising:

input/output means for reading data and generating output;

computer storing means for storing data and computer programs;

a set of object-oriented learning engines being a set of executable computer programs stored in said computer storing means for mining source data and generating a set of object-oriented knowledge bases through the aid of said set of CPUs of said digital computer; and a set of object-oriented inference engines being a set of executable computer programs stored in said computer storing means for reasoning about said set of object-oriented knowledge bases and generating inference results; wherein A. said set of object-oriented learning engines comprising:
  a. means for reading data from said source data through said input/output means;
  b. means for selecting a set of attributes and a set of actions from attributes of said source data;
  c. means for creating a set of learning classes in said computer storing means, each one of said learning classes comprising said set of attributes, said set of actions, and a set of learning objects;
  d. means for assigning a set of positive decision values and a set of negative decision values in said set of actions and means for classifying said set of learning objects into positive objects and negative objects;
  e. means for clustering all identical objects into a single combined object;
  f means for counting positive count and negative count of said combined object;
  g. means for combining conjunctive objects of higher rank to form a combined conjunctive object of lower rank;
  h. means for deleting unqualified conjunctive objects; and
  i. means for generating said set of object-oriented knowledge bases in said computer storing means, each one of said object-oriented knowledge bases comprising a set of knowledge base objects;
B. said set of object-oriented inference engines comprising:
  a. means for scanning all fields of said set of knowledge base objects generated by said set of object-oriented learning engines in said computer storing means;
  b. means for creating a set of knowledge classes, each one of said knowledge classes comprising a set of attributes, a set of actions, a set of knowledge objects, and a test object;
  c. means for entering test data into said test object;
  d. means for comparing said test object with each one of said knowledge objects in the same one of said knowledge classes, and means for determining said test object and said one of said knowledge objects being matched; and
  e. means for executing said set of actions in said one of said knowledge objects through said input/output means.

2. The object-oriented data mining and decision making system of claim 1 further comprises:
A. means for storing all permissible values of each attribute of said learning objects in said computer storing means;
B. means for assigning codes to said permissible values;
C. means for translating said permissible values to said codes;
D. means for creating a set of learning objects with said codes in fields; and
E. means for translating said codes to said permissible values.

3. The object-oriented data mining and decision making system of claim 1 wherein said source data are a set of databases.

4. The object-oriented data mining and decision making system of claim 1 wherein each one of said learning classes comprises additional attributes, for storing said positive count, for storing said negative count, and for storing a certainty factor for each one of said learning objects.

5. The object-oriented data mining and decision making system of claim 1 further comprises means for calculating a certainty factor for each one of said learning objects.

6. The object-oriented data mining and decision making system in claim 5 further comprises:
  means for assigning threshold conditions for said certainty factor and for said positive count of each one of said learning objects; and
  means for determining whether said each one of said learning objects satisfying said threshold conditions.

7. The object-oriented data mining and decision making system of claim 1 further comprises means for object-oriented bottom-up conjunctive generalization.

8. An object-oriented data mining system in a digital computer for mining data and generating a set of object-oriented knowledge bases through the aid of a set of CPUs of said digital computer, comprising:
  input/output means for reading data and generating output;
  computer storing means for storing data and computer programs;
  a set of object-oriented learning engines being a set of executable computer programs for mining source data and generating said set of object-oriented knowledge bases through the aid of said set of CPUs of said digital computer, comprising:
means for reading data from said source data through said input/output means;
  means for selecting a set of attributes and a set of actions from said source data;
  means for creating a set of learning classes in said computer storing means, each one of said learning classes comprising said set of attributes, said set of actions, and a set of learning objects;
  means for assigning a set of positive decision values and a set of negative decision values in said set of actions and means for classifying said set of learning objects into positive objects and negative objects;
  means for clustering all identical objects into a single combined object;
  means for counting and saving positive count and negative count of said combined object;
  means for combining conjunctive objects of higher rank to form a combined conjunctive object of lower rank;
  means for deleting unqualified conjunctive objects; and
  means for generating said set of object-oriented knowledge bases in said computer storing means, each one of said object-oriented knowledge bases comprising a set of knowledge base objects.

9. The object-oriented data mining system of claim 8 wherein said source data are a set of databases.

10. The object-oriented data mining system of claim 8 wherein each one of said learning classes comprises additional attributes, for said positive count, for said negative count, and for a certainty factor.

11. The object-oriented data mining system of claim 10 further comprises means for calculating said certainty factor for each one of said learning objects.

12. The object-oriented data mining system of claim 11 further comprises:
  means for assigning threshold conditions for said certainty factor and for said positive count to each one of said learning objects; and
  means for determining whether each one of said learning objects satisfying said threshold conditions.

13. The object-oriented data mining system of claim 8 further comprises means for creating a set of subclasses of said learning classes, each one of said subclasses comprising attributes for storing said positive count, for storing said negative count, and for storing a certainty factor for said learning objects.

14. The object-oriented data mining system of claim 8 further comprises:

means for storing all possible values of each attribute of said learning classes in said computer storing means;

means for assigning codes to said possible values;

means for translating said possible values to said codes;

means for creating a set of learning objects with said codes of values; and means for translating said codes to said possible values.

15. The object-oriented data mining system of claim 8 further comprises means for fuzzifying values in a subset of said attributes.

16. The object-oriented data mining system of claim 8 further comprises means for bottom-up object-oriented conjunctive generalization.

17. An object-oriented decision making system in a digital computer, comprises:

input/output means for reading data and generating output;

computer storing means for storing data and computer programs;

a set of object-oriented knowledge bases storing in said computer storing means, each one of said object-oriented knowledge bases comprising a set of attributes, a set of actions, and a set of knowledge base objects; intersections of said attributes and said knowledge base objects being called fields of said knowledge base objects, data stored in said fields being called values, intersections of said actions and said knowledge base objects being called decision-fields of said knowledge base objects, data stored in said decision-fields being called decision statements of said knowledge base objects;

a set of object-oriented inference engines being a set of executable computer programs stored in said computer storing means for reasoning about said set of object-oriented knowledge bases and generating inference results based on a set of test data, comprising:

means for creating a set of knowledge classes, each one of said set of knowledge classes comprising a set of attributes, a set of actions, and a set of knowledge objects, and a test object; intersections of said attributes and said knowledge objects being called fields of said knowledge objects, and intersections of said actions and said knowledge objects being called decision-fields of said knowledge objects, values stored in said decision-fields being called decision statements of said knowledge objects;

means for scanning said fields in each one of said knowledge objects in said computer storing means;

means for obtaining test data and entering said test data into said test object, means for comparing test object with each one of said knowledge objects, and means for determining the two compared objects being matched; and means for executing said set of decision statements in said knowledge objects through said input/output means.

18. The object-oriented decision making system of claim 17 further comprises:

means for storing all permissible values of each one of said attributes and all decision statements in each one of said actions of each one of said knowledge classes in said computer storing means;

means for assigning a code to each one of said permissible values and each one of said decision statements;

means for translating said permissible values and said decision statements to codes;

means for creating a set of knowledge objects in said computer storing means with said code in each one of said fields, and in each one of decision fields; and means for translating said codes to said permissible values and to said decision statements.

19. The set of object-oriented inference engines of claim 17 further comprises means for querying environments of said object-oriented knowledge-based system to obtain said test data.

20. The test data of claim 17 are fed from said input/output means of said object-oriented knowledge-based system into said computer storing means directly.

* * * * *